(12) United States Patent
Höfken

(10) Patent No.: US 7,163,198 B2
(45) Date of Patent: Jan. 16, 2007

(54) STIRRING AND AERATING DEVICE FOR ACTIVATED SLUDGES

(75) Inventor: Marcus Höfken, Erlangen (DE)

(73) Assignee: Invent Umwelt - und Verfahrenstechnik GmbH & Co., Erlangen (DE)

( * ) Notice: Subject to any disclaimer, the term of this patent is extended or adjusted under 35 U.S.C. 154(b) by 164 days.

(21) Appl. No.: 10/513,947

(22) PCT Filed: May 6, 2003

(86) PCT No.: PCT/EP03/04730

§ 371 (c)(1),
(2), (4) Date: Nov. 9, 2004

(87) PCT Pub. No.: WO03/095081

PCT Pub. Date: Nov. 20, 2003

(65) Prior Publication Data

US 2005/0161838 A1    Jul. 28, 2005

(30) Foreign Application Priority Data

May 10, 2002  (DE) .......................... 202 07 376 U

(51) Int. Cl.
*B01F 3/04*  (2006.01)
(52) U.S. Cl. .......................... 261/91; 261/93
(58) Field of Classification Search .............. 261/83, 261/84, 85, 87, 91, 93, DIG. 70, DIG. 71
See application file for complete search history.

(56) References Cited

U.S. PATENT DOCUMENTS

| 1,704,013 | A | * | 3/1929 | Minogue | 261/87 |
| 2,865,618 | A | * | 12/1958 | Abell | 261/93 |
| 3,385,576 | A | * | 5/1968 | Wikswo | 261/93 |
| 3,498,459 | A | * | 3/1970 | Bohnke | 210/208 |
| 3,796,417 | A | * | 3/1974 | Kaelin | 261/93 |
| 4,086,306 | A | * | 4/1978 | Yoshinaga | 261/93 |
| 4,210,534 | A |   | 7/1980 | Molvar |  |
| 5,925,293 | A | * | 7/1999 | Howk | 261/93 |

FOREIGN PATENT DOCUMENTS

| DE | 198 26 098 A1 | 12/1999 |
| EP | 0 562 314 B1 | 8/1996 |

* cited by examiner

*Primary Examiner*—Scott Bushey
(74) *Attorney, Agent, or Firm*—Rankin, Hill, Porter & Clark LLP

(57) ABSTRACT

A stirring and aerating device for activated sludges, wherein a towerlike frame is formed by a carrier element (2, 3) receiving a drive device (1) and at least three support elements (4) extending from said carrier element, wherein an air inlet is provided for an aerating device (7) located in a plane beneath a stirring element (9) that is connected to the drive device (1) by the shaft (10). In order to increase service life of the device, the air is let in through a passage resembling a line that extends in a longitudinal direction in at least one of the support elements (4).

10 Claims, 2 Drawing Sheets

STIRRING AND AERATING DEVICE FOR ACTIVATED SLUDGES

Figure 1:
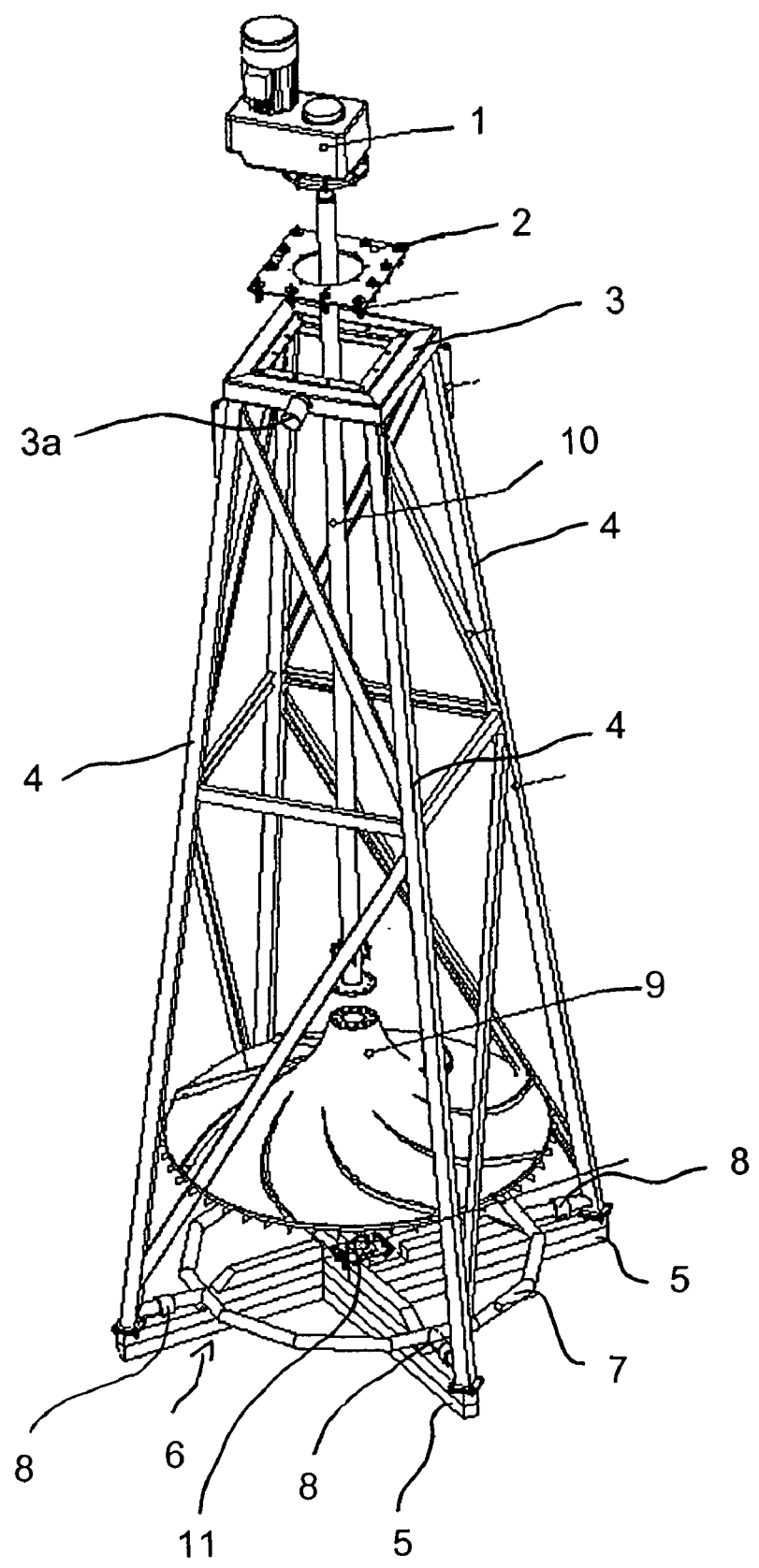

The invention relates to a stirring and aerating device for activated sludges.

Such a stirring and aerating device is known from DE 198 26 098 C2. For the aerating unit, the known device has a separate air inlet line installed on a tower-like frame. The air inlet line creates a resistance in the flowing activated sludge. This may cause vibrations which may disconnect the mounting elements holding the air inlet line. Repair of such torn off mounting elements is extremely expensive/time-consuming. It may also be necessary to hoist the entire stirring and aerating device out of the settling tank.

From DE 42 18 027 a further stirring and aerating device is known. With this an aerating unit is provided in a plane below the stirring element. The aerating device is connected via a tube to a source of compressed air. In actual practice the connection between the tube and aerating unit has not proven to be particularly stable.

From DE 298 16 516 U1 a device for the ventilation of ground water is known. With this an air inlet unit connected to an oxidation container is established from a perforated pipe carrier combination which is covered with a membrane tube. The membrane tube has slit-shaped pores.

U.S. Pat. No. 4,431,597 describes a mixing device for liquids. With this a jet connected to a separate gas line can be provided in the vicinity of a propeller. When the propeller is in operation, gas is fed with the jet into the liquid according to the Venturi principle.

The object of the invention is to overcome the disadvantages according to the state of technology. In particular a stirring and aerating device is to be specified whose design is simple and compact and which is in particular not prone to repair. According to a further goal of the invention, manufacture of the stirring and aerating device should be as inexpensive as possible and mounting should be simple and quick.

The invention provides that the air supply takes place through a line-type passage extending in the longitudinal direction in at least one of the support elements. The provision of such a line-type passage within the support elements contributes to an especially compact design of the stirring and aerating device. The passage runs parallel to the longitudinal direction or longitudinal extension within the support element. It is no longer necessary to mount a separate air supply line outside on the tower-like frame via holder elements. The air supply line can be integrated in the support element or be formed by the support element itself. The holder element can no longer be torn off. In this regard, the suggested stirring and aerating device is particularly not prone to repairs.

It is advantageous that the carrier element has an air collection canal connected with the passage. It is useful that the air collection canal is formed in the shape of a ring. It is advantageous that it has a connection. The air collection canal can be connected via this connection with a source of compressed air.

According to a further embodiment feature the aerating unit is connected to or in the vicinity of a lower, i.e., located at a distance from the air collection canal, end of the support element with the passage. The air inlet thus extends almost over the entire height of the device from the air collection canal up to the vicinity of the floor-side, lower end of the support element.

According to a particularly advantageous embodiment, all support elements have a line-type passage in the longitudinal direction and the air supply takes place through all passages. In this case it is advantageous that the passages of all support elements are connected with the air collection canal.

According to a further embodiment feature the aerating unit is a, preferably connected with all passages, ring line equipped with aerating openings. It is useful that the ring line is surrounded by the support elements. This makes aerating of the stirring element from the bottom particularly effective.

According to a further embodiment, the support elements can be connected on their lower end to a foot. The aerating unit can be part of the foot and the passages can be connected with aerating lines having at least one aerating opening which lines are contained in the foot. With the minimum of one aerating opening, this can be a pipe connection directed towards the bottom side of the stirring element pointing away from the drive device.

According to a further embodiment the foot can have a centrally located bearing trapping an end of the shaft protruding from the bottom of the stirring element. It is useful that the foot is formed from the foot elements extending from the lower end of the support elements which are connected with each other such that they surround said bearing. This makes it particularly simple to implement a holder for said bearing.

Figure 3:
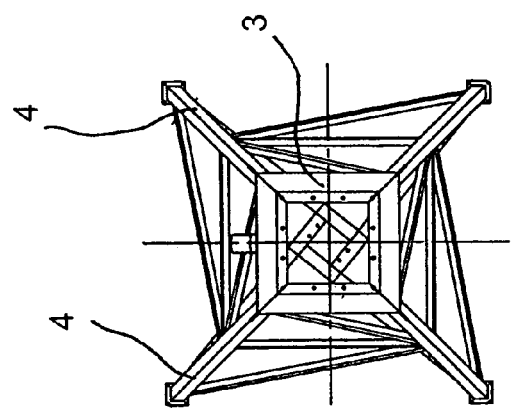
Figure 2:
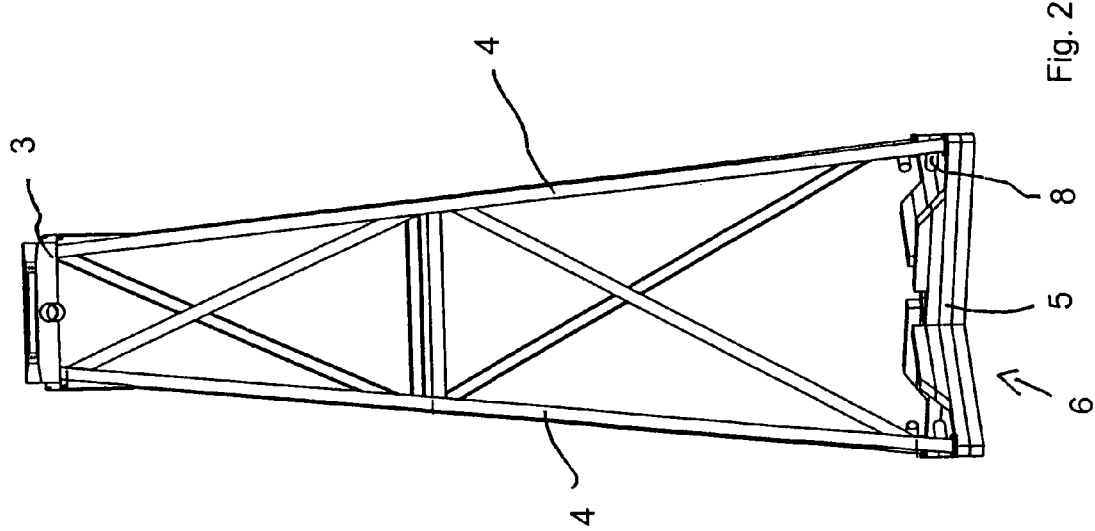

An example will now be used to describe the invention in more detail based on the drawing. The figures are listed below:

FIG. 1 A blow-up view in perspective of a device according to the invention, FIG. 2 a side view of the frame of the device according to FIG. 1 and FIG. 3 a view of the top according to FIG. 2.

On the stirring and aerating device shown in FIG. 1 to 3, a drive device 1, for example an electro motor with a gearbox, is mounted on a tower-like frame. The tower-like frame has a carrier element located above the level of a (not shown here) activated sludge which carrier element contains a carrier plate 2 to hold the drive device 1 and an air collection canal 3. The carrier plate 2 is supported on a circumferential flange protruding inwardly from the air collection canal 3. The air collection canal 3 is provided with a pipe connection 3a. Four support elements 4 which are formed here as hollow, square pipes extend from the air collection canal 3. The support elements 4 are each supported on a bar-type foot element 5 of a foot generally designated with the reference label 6. A ring line designated as 7 is connected with connection pieces 8 in the vicinity of the lower end of each of the support elements 4. The ring line 7 has (not shown here) aerating openings which point to the bottom of a hyperbolic-type stirring element 9. The stirring element 9 is connected to the drive device 1 via a perpendicular shaft 10.

The end of the shaft 10 opposite the drive device 1 which end is protruding from the (not shown here) bottom of the stirring element 9 is held in a central bearing 11 installed on the foot 6.

As can be seen particularly well in FIGS. 2 and 3, the foot elements 5 each extend staggered in the direction of the support element 4 located opposite. A box-type structure is thus created in the center of the foot 6 in which the safety bearing can be installed. It is useful that the foot elements 5 are made of cast iron. They can be mounted simply.

The function of the device is listed below:

A (not shown here) source of compressed air is connected via a tube or a line to the pipe connection 3a of the air collection canal 3. The compressed air supplied to the air collection canal 3 moves through the hollow support elements 4 and the connection pieces 8 located in the vicinity of the foot 6 and into the ring line 7. The compressed air exits via the aerating openings or jets provided in the ring line 7. The stirring element 9 whirls the rising air together with the activated sludge.

REFERENCE DESIGNATION LIST

1 Drive unit
2 Carrier plate
3 Air collection canal
3a Pipe connections
4 Support element
5 Foot element
6 Foot
7 Ring line
8 Connection piece
9 Stirring element
10 Shaft
11 Bearing

The invention claimed is:

1. A stirring and aerating device for activated sludges comprising:
    a frame formed from a carrier element (2, 3) holding a drive device (1);
    at least three support elements (4) extending from the carrier element; and
    an air supply for an aerating device (7), the aerating device located on a plane below a stirring element (9), the stirring element connected with the drive device (1) via a shaft (10),
    wherein the air supply takes place through a passage extending in a longitudinal direction in at least one of the support elements (4),
    wherein the aerating device is a ring line (7) being equipped with aerating openings, and
    wherein the ring line (7) is surrounded by the support elements (4) and is connected on a lower end of the support element (4) with the passage.

2. The stirring and aerating device of claim 1, wherein the carrier element (2, 3) has an air collection canal (3) connected with the passage.

3. The stirring and aerating device of claim 2, wherein the air collection canal (3) is connected to a source of compressed air.

4. The stirring and aerating device of claim 1, wherein all support elements (4) have a passage extending in the longitudinal direction and the air supply takes place through all passages.

5. The stirring and aerating device of claim 4, wherein the aerating device is a ring line (7) equipped with aerating openings and connected with all of the passages.

6. The stirring and aerating device of claim 1, wherein the support elements (4) are connected with a foot (6) on their lower end.

7. The stirring and aerating device of claim 5, wherein the support elements (4) are connected with a foot (6) on their lower end, and wherein the aerating device (7) is part of the foot (6) and the passages are connected with aerating lines having at least one aerating opening each provided in the foot (6).

8. The stirring and aerating device of claim 6, wherein the foot (6) has a centrally located bearing (11) for an end of the shaft (10) protruding from the bottom of the stirring element (9).

9. The stirring and aerating device of claim 8, wherein the foot (6) is formed from foot elements (5) extending from the lower end of the support elements (4) which are connected together such that they surround a safety bearing (11).

10. A stirring and aerating device for activated sludges comprising:
    a frame formed from a carrier element (2, 3) holding a drive device (1);
    at least three support elements (4) extending from the carrier element; and
    an air supply for an aerating device (7), the aerating device located on a plane below a stirring element (9), the stirring element connected with the drive device (1) via a shaft (10),
    wherein all support elements (4) have a passage extending in the longitudinal direction and the air supply takes place through all passages,
    wherein the aerating device is a ring line (7) equipped with aerating openings and connected with all of the passages, and
    wherein the support elements (4) are connected with a foot (6) on their lower end,
    and wherein the aerating device (7) is part of the foot (6) and the passages are connected with aerating lines having at least one aerating opening each provided in the foot (6).

* * * * *